United States Patent [19]
Ide et al.

[11] Patent Number: 5,491,020
[45] Date of Patent: Feb. 13, 1996

[54] MOLDED BOARDS OF CALCIUM SILICATE AND PROCESS FOR PRODUCING THE SAME

[75] Inventors: Tsutomu Ide, Mie; Suguru Hamada, Gifu, both of Japan

[73] Assignee: Kabushiki Kaisha Osaka Packing Seizosho, Osaka, Japan

[21] Appl. No.: 338,797

[22] Filed: Nov. 10, 1994

Related U.S. Application Data

[62] Division of Ser. No. 13,215, Feb. 1, 1993, Pat. No. 5,411,793, which is a continuation of Ser. No. 547,002, Jul. 2, 1990, abandoned, which is a continuation-in-part of Ser. No. 360,928, Feb. 21, 1989, abandoned, and a continuation-in-part of Ser. No. 347,959, Feb. 3, 1989, abandoned.

[30] Foreign Application Priority Data

Jun. 12, 1987 [WO] WIPO ............. PCT/JP87/00383
Jun. 26, 1987 [JP] Japan ................... 62-160280
Jun. 24, 1988 [WO] WIPO ............. PCT/JP88/00630

[51] Int. Cl.$^6$ ..................................... B32B 7/02
[52] U.S. Cl. .................. 428/215; 162/120; 162/145; 162/146; 162/181.6; 428/331; 428/332; 428/698; 428/702; 428/703; 428/920; 428/921
[58] Field of Search ................... 162/120, 145, 162/146, 181.6; 428/215, 331, 332, 698, 702, 703, 920, 921; 524/404, 413, 443, 456

[56] References Cited

U.S. PATENT DOCUMENTS

| | | | |
|---|---|---|---|
| 3,951,735 | 4/1976 | Kondo et al. | 162/133 |
| 4,144,121 | 3/1979 | Otouma et al. | 162/145 |
| 4,371,579 | 2/1983 | McCaskey et al. | 428/331 |
| 4,426,470 | 1/1984 | Wessling et al. | 524/35 |
| 4,647,499 | 3/1987 | Takahashi et al. | 428/312.6 |
| 4,652,324 | 3/1987 | Yamashina et al. | 156/242 |
| 4,680,227 | 7/1987 | Aoyogi et al. | 428/331 |
| 4,681,809 | 7/1987 | Kitano | 428/428 |
| 4,780,180 | 10/1988 | Take et al. | 162/145 |
| 4,877,679 | 10/1989 | Leatherman et al. | 428/224 |
| 5,045,385 | 9/1991 | Luckanuck | 428/331 |

Primary Examiner—D. S. Nakarani
Attorney, Agent, or Firm—Armstrong, Westerman, Hattori, McLeland & Naughton

[57] ABSTRACT

A board of calcium silicate crystals, characterized in that the board is composed of a plurality of layers of laminated thin sheets, each of the thin sheets having a thickness of 2 mm or less, each layer comprising secondary particles of calcium silicate crystals, a fibrous material, a coagulant and preferably additionally a polymer adsorbed on the surface of the secondary particles of calcium silicate; wherein each layer contains secondary calcium silicate particles interconnected with one another, and wherein the superposed thin sheets are firmly united with one another into an integral body by the interlayer interconnection of secondary particles of calcium silicate crystals present on the surface of the sheets.

10 Claims, No Drawings

MOLDED BOARDS OF CALCIUM SILICATE AND PROCESS FOR PRODUCING THE SAME

This is a division of application Ser. No. 08/013,215 filed Feb. 1, 1993, now U.S. Pat. No. 5,411,793, which is a continuation of application Ser. No. 07/547,002, filed Jul. 2, 1990, (now abandoned) which is a continuation-in-part of application Ser. No. 07/360,928, filed Feb. 21, 1989 (now abandoned) and application Ser. No. 07/347,959, filed Feb. 3, 1989 (now abandoned).

FIELD OF THE INVENTION

The present invention relates to molded boards of calcium silicate, and a process for producing the same, and more particularly to molded boards of calcium silicate containing a polymer and a process for producing the same.

BACKGROUND ART

Molded boards of calcium silicate are widely used as building materials, structure materials or the like because these boards are lightweight and outstanding in fire resistance, heat resistance, etc. However, the calcium silicate molded boards as compared with wood are not fully satisfactory in mechanical strength and are low in water resistance. Further these molded boards have the drawbacks of being poor in workability such as suitability for being cut, machinability, nailability, nail-retaining ability and properties of permitting carving and modeling such as suitability for being grooved, and thus unavoidably have a limited use.

In recent years, it has been proposed to incorporate a vinyl-type polymer, natural or synthetic rubber of like polymer into molded boards of calcium silicate in order to eliminate the foregoing drawbacks of the boards (e.g. Japanese Unexamined Patent Publications Nos. 15516/1977; 16024/1979; 264355/85; and 123053/1987). These publications specifically disclose calcium silicate molded boards having a single-layer structure in which the secondary particles of calcium silicate crystals are interconnected with one another directly and via the polymer.

Such molded boards are given enhanced mechanical strength and improved water resistance and workability due to the presence of the resin. Yet the mechanical strength of the boards remains unsatisfactory. With an increase of specific gravity, a calcium silicate molded product is given enhanced strength in proportion but is deprived of its lightweight property among the characteristics of calcium silicate molded product. While the strength of calcium silicate molded product can be improved by using an increased amount of resin, the increase of resin content lowers the incombustibility and heat resistance of the molded product, leading to loss of characteristics of calcium silicate molded product. Because of the single-layer structure, said molded product has high density in the surface portion but low density in the interior, namely irregular density as a whole, so that when exposed to high temperatures as in a fire, the molded product is likely to shrink, deform, warp and crack. Although they have improved workability, such molded product tends to chip off at the cut end during cutting or machining operation and to remain insufficient in nail-retaining ability and carving and modeling properties, such as suitability for being grooved.

Japanese Examined Patent Publication No. 40896/1973 discloses a board of calcium silicate crystals composed of secondary particle of xonotlite crystals and wood fibers. Said board is produced by forming a single layer of wet mat from an aqueous slurry of secondary particles of xonotlite crystals and wood fibers with use of a forming machine and press-molding the layer of wet mat with heating. The board of calcium silicate crystals obtained by such method is one press-molded from the single layer of wet mat and contains as the constituents the secondary particles of xonotlite crystals and wood fibers.

The board of calcium silicate crystals having the above construction is insufficient in the strength, particularly bending strength, even if the board is composed predominantly of wood fibers, that is containing 50% or more thereof. This tendency is pronounced in the board composed predominantly of calcium silicate crystals, more specifically containing a small amount of wood fibers and 50% or more of calcium silicate crystals. In particular the board containing 80% or more of calcium silicate crystals has an unsatisfactory strength. On the other hand, the smaller the amount of wood fibers, the more preferable the board is from an incombustibility view point. However, the aforesaid technique can not produce boards sufficient in both incombustibility and satisfactorily great strength. The '896 publication teaches nothing about the use of inorganic fibers to produce an article of great strength. Among the boards thus produced, those of large thickness tend to have a reduced bending strength due to the irregularity of strength caused by the difference in the proportions of calcium silicate crystals and wood fibers between the internal and external board portions. Further this tendency becomes marked in boards having a thickness of 20 mm or more.

DISCLOSURE OF THE INVENTION

An object of the present invention is to provide a board of calcium silicate crystals outstanding in mechanical strength, particularly bending strength.

Another object of the invention is to provide a board of calcium silicate crystals which contains a predominant amount of calcium silicate crystals and a small amount of wood fibers or inorganic fibers in lieu of wood fibers and which is thus incombustible and excellent in mechanical strength.

A further object of the invention is to provide a board of calcium silicate crystals which, even in large thickness, is substantially homogenous throughout its interior and has excellent mechanical strength.

A still further object of this invention is to provide molded boards of calcium silicate which, while retaining the characteristics of calcium silicate molded boards, such as lightweight characteristic, incombustibility and heat resistance, are significantly improved in mechanical strength, water resistance and workability in which conventional calcium silicate molded boards have been defective, and a process for producing the same.

The present invention provides molded boards of calcium silicate which are far greater in mechanical strength than conventional calcium silicate molded boards of single-layer structure and a process for producing the same.

The present invention also provides molded boards of calcium silicate which are outstanding in workability such as suitability for being cut, machinability, nail-retaining ability, carving and modeling properties, etc. and a process for producing the same.

The present invention further provides molded boards of calcium silicate which are unlikely to deform, warp or crack on exposure to high temperatures as in a fire, and a process for producing the same.

The molded boards of calcium silicate crystals according to one aspect of the present invention are characterized in that they are composed of a laminate of a plurality thin sheets, each having a thickness of about 2 mm or less, containing secondary particles of calcium silicate crystals, a fibrous material and a coagulant adsorbed on the surface of the secondary particles. The secondary particles are interconnected with one another. Said superposed thin sheets are firmly united with one another into an integral body by the intrabonding of the secondary particle of calcium silicate crystals present on the surface of the sheets.

The molded boards of another aspect of this invention are characterized in that the board is a laminate of a plurality of thin sheets, each of the thin sheets having a thickness of 2 mm or less and comprising secondary particles of calcium silicate crystals, and a fibrous material, a polymer and a coagulant, the polymer and the coagulant being adsorbed on the surface of secondary particles. The secondary particles are interconnected with one another directly via the polymer and the coagulant adsorbed on the secondary particles. The laminated thin sheets are firmly united with one another into an integral board by the interconnection of the secondary particles of calcium silicate crystals by means of the polymer and coagulant present on the surface of the sheets.

Our research revealed the following. In the board of calcium silicate crystals formed from secondary particles of calcium silicate crystals, a coagulant and a fibrous material, the secondary particles retain the coagulant adsorbed on the surface thereof and are interlocked with one another to form thin sheets and a plurality of such thin sheets are superposed and firmly interconnected by the secondary particles on the surface of sheets into a thicker integral laminated sheet. With this structure, the board exhibits a significantly greater mechanical strength, even if each of the sheets or some of them are composed predominantly of calcium silicate crystals, and displays a greater mechanical strength even if it contains 20% or less of wood fibers or synthetic or inorganic fibers instead of wood fibers. Boards, even of large thickness, have a uniformly greater mechanical strength as a whole.

Furthermore, unlike conventional asbestos cement slates, the boards of calcium silicate crystals according to this aspect of the present invention have the advantages of being low in specific gravity, excellent in strength and in fabrication property, such as nailability, and easy to pattern on the surface.

Further, in a molded board of calcium silicate according to another aspect of the invention, polymer and coagulant are adsorbed and retained on the surface of secondary particles of calcium silicate crystals. The secondary particles are interconnected with one another directly via the coagulant and via the polymer to form thin sheets, and a plurality of the thin sheets are laminated to firmly unite each with one another into an integral body by the secondary particles and the polymer on the surface of sheets. With this structure, the molded boards of the invention exhibit mechanical strength much greater than conventional unlaminated polymer-containing calcium silicate molded boards while retaining the lightweight property, incombustibility and heat resistance, i.e. characteristics of calcium silicate molded boards, and are outstanding also in heat resistance, water resistance and workability such as suitability for being cut, machinability, nail-retaining ability, carving and modeling properties, etc. Utilizing these advantages, the molded boards of the invention can be widely used not only for applications as synthetic wood, for which known calcium silicate molded boards have been used, but also even for applications for which real wood has been conventionally employed.

Thus the molded boards of the invention are significantly useful. Since the molded boards of the invention are composed of integrally laminated thin sheets each having a thickness of 2 mm or less, the boards are pronouncedly homogeneous throughout their thickness as well as on their surfaces. Thus the surface of such boards is at least equal in density to the interior thereof. In some cases, the surface density may be somewhat higher than the interior density. With this feature, the boards are unlikely to shrink, deform, warp or crack even on exposure to high temperatures as in a fire. Further, even if they have a low specific gravity, the molded boards of the invention have great mechanical strength and moreover, a degree of strength sufficient for use even if they have a low specific gravity of about 0.3 g/cm$^3$. Further, the molded boards of the invention are so homogeneous along their length that not only the boards of 20 mm or more thickness but also those of less than 20 mm thickness have high shape rententivity and are not apt to warp or shrink during drying or storage.

The thin sheets which will be laminated together to make up the board of the invention may contain at least one substantially inert substance selected from a carbonaceous substance, carbide, nitride, silicide and metallic oxide, in addition to the secondary particles of calcium silicate crystals and other components. With this addition, a board is obtained which has outstanding heat insulation properties over a wide temperature range, particularly a high temperature range. Consequently the inclusion of said inert substance in the board of the invention is among the preferred embodiments of the invention.

The molded boards of calcium silicate according to the invention can be produced by forming an aqueous slurry comprising secondary particles of calcium silicate crystals, a fibrous material, and a coagulant, with or without added polymer into thin sheets. After at least partially draining the slurry, a board is made by superposing a plurality of the thin sheets in layers, then press-molding and drying.

The secondary particles of calcium silicate crystals comprising the board of the invention may be for example those of tobermorite crystals, xonotlite crystals and/or wollastonite crystals. It is suitable to use one or more kinds of these crystals. The secondary particles of calcium silicate crystals can be prepared, for example, by the methods disclosed in Japanese Examined Patent Publication No. 12526/1978 and Japanese Unexamined Patent Publication No. 146997/1978 in which a siliceous material and calcareous material are heated with stirring under an elevated pressure in an autoclave to undergo a hydrothermal synthesis reaction.

It is desirable that xonotlite crystals be used in a predominant amount among the calcium silicate crystals from the viewpoints of the strength and heat resistance of the resulting molded boards.

Starting materials for producing the calcium silicate crystals can be any of those heretofore known. Useful siliceous materials include, for example, natural amorphous silicic acid, siliceous sand, silica gel, silica flour (such as ferrosilicon dust, etc.), ash of chaff and stalks of grasses (ash of chaff of rice plant, barley or the like), white carbon, diatomaceous earth, silicas obtained by reacting an aluminum hydroxide with the hydrosilicofluoric acid produced as a by-product in a wet process for preparing a phosphoric acid, etc. Examples of useful calcareous materials are quick lime, slaked lime, carbide residuum, cement, etc. These siliceous and calcareous materials can be used singly or in admixture of at least two of them. The mole ratio of the calcareous material to the siliceous material can be suitably determined depending on the kind of calcium silicate crystals to be produced. The $CaO/SiO_2$ mole. ratio is between about 0.8 and about 1.3 preferably 0.9 to 1.15, in synthesis of xonotlite crystals and between about 0.7 and about 0.9 in synthesis of tobermite crystals.

The amount of water which is used in preparation of the starting slurry is about 5 times or more, preferably about 10 to about 50 times, the weight of the solids of the starting slurry. The water is suitably added to the solid materials. The starting slurry thus obtained is then subjected to a hydrothermal synthesis reaction with stirring, thereby producing secondary particles of calcium silicate crystals. Preferred reaction conditions are as follows: the reaction is conducted under a saturated aqueous vapor pressure of about 8 $kg/cm^2$ or more, preferably about 10 to about 20 $kg/cm^2$, for formation of xonotlite crystals, or about 4 $kg/cm^2$ or more, preferably about 5 to about 10 $kg/cm^2$, for formation of tobermite crystals; and the reaction time ranges from about 0.5 to 20 hours, preferably about 1 to about 8 hours.

When the secondary particles of xonotlite crystals, obtained by the hydrothermal synthesis reaction, are further baked to about 1000° C., the crystals constituting the secondary particles can be converted to β-wollastonite crystals without change of their shape (secondary particles). The secondary particles of such wollastonite crystals can be also used in the invention.

A fibrous material, a coagulant, and a polymer if used, are added to the aqueous slurry of secondary particles of calcium silicate crystals according to the invention. Fibrous materials for use in the invention can be any of the usual organic and inorganic fibers. Useful organic fibers include natural cellulosic fibers such as cotton, wood pulp, waste paper pulp, knots residuum, flax, shredded straws, rayon and the like, and synthetic fibers such as polyamide, polyester, VINYLON (artificial fiber composed of polyvinyl alcohol), RAYON (artificial fiber composed of regenerated cellulose; and change "aramid" to ARAMID (artificial fiber composed of aromatic polyamide, aramid, polyolefin and the like. Illustrative of useful inorganic fibers are asbestos, rockwool, slag wool, glass fibers, silica fibers, alumina fibers, ceramic fibers, carbon fibers, inorganic whiskers and the like. These fibrous materials are usable singly or in combination with each other.

According to the present invention, boards of great strength can be produced even with the use of a small amount of fibrous material in mixture with a major amount of calcium silicate crystals. Consequently it is possible to obtain boards having great strength and outstanding incombustibility by use of small amounts of organic fibers. Noninflammable boards of great strength can be also produced by the use of inorganic alone without the use of organic fibers.

The amount of the fibrous material used can be as small as about 2 to as much as about 30% by weight based on the solids of aqueous slurry containing the fibrous material. According to the invention, the use of a predominant amount of calcium silicate crystals results in production of molded boards of great strength and renders the aqueous slurry suitable for formation into sheets, facilitating the production of desired molded board. A preferred amount of fibrous material used is about 5 to about 15% by weight.

Coagulants useful in the invention include, for example, cationic coagulants, anionic coagulants and nonionic coagulants. These coagulants are usable singly or in combination of at least two of them in admixture. Particularly the conjoint use of cationic coagulants and anionic coagulants is preferred. The coagulant used in producing the board of the invention results in the improvement of filtering property, efficient molding and production of a board of great strength.

Preferred coagulants are polymeric ones. Examples of useful cationic coagulants are polyethyleneimine, dialkylamine-epichlorohydrin polycondensate, polyamideamine-epichlorohydrin modified product, cationic polyacrylamide and like cationic polymeric coagulants. Also useable are cationic inorganic coagulants such as aluminum polychloride, aluminum sulfate, sodium aluminate, ferrous sulfate, ferric sulfate, ferric chloride and the like. Representative of useful anionic coagulants are ammonium polyacrylate, sodium polyacrylate and like polyacrylates and acrylamide-acrylic acid copolymer, etc. Exemplary of useful nonionic coagulants are polyacrylamide, polyethylene oxide and the like.

The content of coagulant in the molded body of the invention is 1.5% by weight or less, preferably 0.05 to 1.0% by weight, when a cationic, anionic or nonionic coagulant is used singly. When a cationic coagulant and an anionic or nonionic coagulant are conjointly used, about 0.05 to about 1.0% by weight of the cationic coagulant and about 0.01 to about 1.0% by weight of the anionic or nonionic coagulant are employed, preferably in a total amount of less than about 1.5% by weight.

Although not being bound by any particular theory of operation, the coagulants used in the present invention are believed to produce the contemplated effects for the following reasons. A cationic, anionic or nonionic coagulant used singly is adsorbed on the surface of secondary particles of calcium silicate so that the secondary particles and the fibrous material are coagulated with one another by the adsorbed coagulant. When a cationic coagulant and an anionic or nonionic coagulant are conjointly used, the cationic coagulant is caused to become adsorbed on the secondary particles of calcium silicate, which inherently have a negative electric charge. By giving a positive electric charge to the secondary particles the calcium silicate secondary particles are strongly united with one another by the anionic or nonionic coagulant. This structure improves the ability of the calcium silicate to filter out; and change "in" to from solids in the slurry.

The coagulant may be used conjointly with the polymer in this invention and serves to enlarge, strengthen and stabilize the flock in the slurry and to enhance the filtering property of the aqueous slurry to be formed into thin sheets. Of these coagulants, desirable are cationic macromolecular coagulants having a weight average molecular weight of about 3,000,000 to about 5,000,000, anionic macromolecular coagulants having a weight average molecular weight of about 3,000,000 to about 10,000,000 and nonionic macromolecular coagulants having a weight average molecular weight of about 3,000,000 to about 10,000,000. Further said anionic macromolecular coagulants preferably have an ionic strength of 1.5 meg/g or less. The ionic strength is given by an equation shown below. The neutralization equivalent in the equation is obtained by adding a specific amount of methylglycol chitosan (cationic reagent) to an aqueous solution of anionic macromolecular coagulant, controlling the pH of the mixture to 10, adding Toluidine Blue to the mixture as an indicator and titrating the mixture with an aqueous solution of polyvinyl potassium sulfate (anionic reagent).

$$\text{Ionic strength (meq/g)} = \frac{\text{Neutralization equivalent}}{\text{Solids of anionic coagulant}}$$

Polymers useful in the invention are, for example, acrylic resins, acrylate copolymers, styrene-acrylate copolymers, vinyl acetate resins, ethylene-vinyl acetate copolymers, vinyl chloride resins and like vinyl-type polymers, natural rubbers, styrene-butadiene copolymers (SBR), carboxyl group-containing styrene-butadiene copolymers, acrylonitrile-butadiene copolymers, chloroprene polymers and like synthetic rubbers, phenolic resins, melamine resins and like thermosetting resins and so on. Of these polymers, desirable are acrylate copolymers, styrene-acrylate copolymers, ethylene-vinyl acetate copolymers, carboxy-modified SBR, chloroprene polymers and phenolic resins among which phenolic resins are more preferred because they serve to give molded boards retaining high incombustibility and having great strength and excellent workability, dimensional stability and abrasion resistance. These polymers are useable singly or at least two of them can be used in mixture.

The amount of the polymer used can be selected over a wide range according to the desired application of the molded board. Use of an increased amount of the polymer provides the molded board with greater strength and higher workability but lowers the inherent characteristics of calcium silicate molded boards, such as incombustibility, heat resistance and the like. Usually the amount of the polymer is about 3 to about 20% by weight based on the solids of aqueous slurry. About 3 to about 8% by weight of the polymer is used when highly incombustible boards are required. When a phenolic resin is used as the polymer, the incombustibility would not be reduced even by use of the resin in a large amount relative to the solids of the slurry. Consequently molded boards of great strength and incombustibility can be obtained even by use of large amount of phenolic resin. Further the use thereof gives molded boards of outstanding workability. A suitable amount of phenolic resin used is in the range of 3 to 30% by weight, preferably 10 to 20% by weight, based on the solids of the slurry. The polymer is used in the form of an aqueous emulsion or aqueous latex when incorporated into a slurry of calcium silicate crystals.

Further, various properties of a calcium silicate molded product can be improved by adding additives to the slurry prior to molding. For example, the molded product may contain gypsum or cement to improve the mechanical strength; aluminum hydroxide, natural wollastonite or clay to enhance the heat resistance; a coloring agent to provide a color; and a carbonaceous substance, carbide, nitride, silicide, metallic oxide or the like to improve the heat insulation properties. Examples of useful carbonaceous substances are active carbon, charcoal, coal, carbon black, graphite, etc. Examples of useful carbides are silicon carbide, boron carbide, titanium carbide, etc. Examples of useful nitrides are silicon nitride, titanium nitride, etc. Examples of useful silicides are calcium silicide, etc. Illustrative of metallic oxides are iron oxides, titanium oxides, tin oxides, manganese oxides, zirconium oxides, ilmenite, zircon, chromite, cerium oxides, lanthanum oxides, yttrium oxides, neodymium oxides, etc.

These substances are useable singly or at least two of them can be used in mixture. It is suitable that the active substance be usually about 0.001 to about 120 μm, preferably 0.001 to 100 μm, in particle size.

The content of the inactive substance in the board of the invention can vary over a wide range and ranges usually from about 2 to about 70% by weight, preferably about 5 to about 50% by weight.

For producing the molded board of the invention, an aqueous slurry of secondary particles of calcium silicate crystals is prepared first. The aqueous slurry can be prepared by subjecting a calcareous material and a siliceous material to a hydrothermal synthesis reaction as described hereinbefore, or by dispersing in water the secondary particles of calcium silicate crystals prepared for this purpose. To the aqueous slurry are added a fibrous material, a coagulant and, if used, a polymer. The amounts of these component used are accommodated to the desired contents thereof, calculated as the solids, in the board.

Then thin sheets are formed from the aqueous slurry comprising the secondary particles of calcium silicate crystals, fibrous material, polymer and coagulant. In formation of thin sheets, it is desirable to adjust the solids concentration of the slurry to about 0.2 to about 3% by weight.

Thin sheets are formed by any of continuous methods (cylinder-type, Fourdrinier-type, short wire-type or the like) and batchwise methods (CTC method, Chapman, method or the like). A plurality of thin sheets thus formed are superposed over one another into a laminated sheet. The laminated sheet is cut by a cutter, when so required, and press-molded to a predetermined thickness with heating while being dried. While molding and drying can be consecutively performed, it is preferred to press-mold and dry the sheets at the same time with a hot press or the like with heating. A suitable heating temperature is about 120° to 200° C. and an adequate molding pressure is about 10 to about 100 kg/cm².

When a phenolic resin is used as the polymer, it is desirable to conduct hot pressing at a heating temperature of about 160° to about 200° C. under a molding pressure of about 10 to about 100 kg/cm². The phenolic resin is cured during hot pressing.

The press-molding of superposed thin sheets causes the secondary particles of calcium silicate crystals in each thin sheet to become interconnected with one another directly and through the polymer adsorbed on the secondary particles with the result that each thin sheet is strengthened while the laminated thin sheets are united with one another by the secondary particles of calcium silicate crystals and the polymer present on the surface of each thin sheet, giving a molded board of great strength with the thin sheets firmly united with one another into an integral body. The layers constituting the molded board of the invention are integrally firmly adhered to one another by the secondary particles of calcium silicate crystals and the polymer adsorbed on the secondary particles. A preferable molded board of the invention, for example, even immersed in water at 20° C. for 24 hours, shows no peeling, shows only a slight reduction in bending strength, and remains high in dimensional stability.

Each of the thin sheets constituting the board of the invention has a thickness of about 2 mm or less, preferably about 0.2 to about 1.0 mm. The board of the invention is composed of a plurality of said thin sheets, more specifically 3 to 200 thin sheets, superposed and united into an integral body. The molded boards of the invention, even of a large thickness, are homogeneous throughout and have high bending strength. Thus according to the invention, it is possible to obtain a thick board of 20 mm or more thickness with great strength. Further, because of high homogeneity along its length, a molded board having a thickness of 20 mm or less, or even a thickness of about 1 to about 15 mm, which is conventionally considered to be difficult to produce, can be produced according to the invention with substantially no warping nor contraction occurring during drying.

EXAMPLES

The present invention will be described below in greater detail with reference to Preparation Examples and Examples

TABLE 2-continued

| Specimen No. | 1 | 2 | 3 | 4 | 5 | Comp. Ex. |
|---|---|---|---|---|---|---|
| Number of laminated sheets (number) | 90 | 90 | 90 | 90 | 90 | 90 |
| Density of molded product (g/cm$^3$) | 0.625 | 0.632 | 0.635 | 0.629 | 0.630 | 0.584 |
| Bending strength of molded product (kg/cm$^2$) | 135 | 131 | 120 | 119 | 116 | 65 |
| Thermal linear shrinkage percentage (%) | 1.21 | 1.21 | 1.17 | 1.30 | 1.17 | 1.17 |
| Incombustibility | Incombustible | Incombustible | Incombustible | Incombustible | Incombustible | Incombustible |
| Fabrication quality | Good | Good | Good | Good | Good | — |

EXAMPLE 4

A starting slurry for forming green thin sheets was prepared by the same method as in Example 2 and was made into green thin sheets of about 0.7 mm thickness by a short wire-type forming device. The green thin sheets thus obtained were wound up under a pressure by a making roll and spread out to obtain a sheet-like body of 17.5 mm thickness. Four sheet-like bodies were superposed and press-molded with a hot press with heating at 185° C., producing a 60-mm thick molded board of calcium silicate.

Table 3 shows the amounts of components and properties of the molded board.

TABLE 3

| Specimen No. | 1 |
|---|---|
| Proportions of Components (%) | |
| Xonotlite secondary particles | 89.7 |
| Pulp (NBKP) | 8.0 |
| Glass fibers (Ceramic fibers) | 2.0 |
| Cationic coagulant (Polymaster R-607) | 0.1 |
| Anionic coagulant (Polymaster R-623S) | 0.2 |
| Sheets formed by making roll | |
| Thickness (mm) | 17.5 |
| Number of laminated sheets (number) | 45 |
| Water content (%) | 211 |
| Properties of molded product | |
| Thickness (mm) | 60 |
| Number of laminated sheets (number) | 4 |
| Density (g/cm$^3$) | 0.554 |
| Bending strength (kg/cm$^2$) | 115 |
| Thermal linear shrinkage percentage (%) | 1.27 |
| Incombustibility | Incombustible |
| Fabrication property | Good |

EXAMPLE 5

Quick lime (CaO 95%) was slaked in hot water at 80° C. to produce a milk of lime.. To the milk of lime was added a powder of silica stone (SiO$_2$ 94%), 7.1 μm in mean particle size, in the CaO/SiO$_2$ mole ratio of 1.00. Further added were water and a predetermined amount of a powder of titanium oxide (futile, 1.2 μm in mean particle size) in such an amount that the total amount of water was 12 times the amount of the solids. In this way, a starting slurry was prepared.

The starting slurry was placed into an autoclave under a saturated vapor pressure of 12 kg/cm$^2$ at 191° C. and subjected to a hydrothermal synthesis reaction for 6 hours while being stirred by a stirrer which was rotated at 40 r.p.m. In this way, crystal slurries were produced.

Portions of the crystal slurries obtained above were dried for 24 hours at 100° C. and analyzed by X-ray diffractometer. The analysis revealed the peak of xonotlite crystals in all specimens and further the peak of rutile crystals in the specimens containing titanium oxide particles.

Subsequently, 8% of pulp and 2% of glass fibers were mixed with each of the crystal slurries, and water was added to the mixture to a concentration of 2.0% in the slurry. Further added was a cationic coagulant (Polymaster R-607, product of Hakuto Chemical Co., Ltd.) in an amount of 0.1% based on the slurry solids and then an anionic coagulant (Polymaster R-623S) (product of Hakuto Chemical Co., Ltd.) in an amount of 0.2% based on the slurry solids.

Thereafter each slurry thus obtained was adjusted with water to a concentration of 1.0% and made into green thin sheets of about 0.7 mm thickness with use of a short wire-type forming device. Ninety green thin sheets thus prepared were superposed and press-molded with a hot press to produce a 40 mm-thick molded board of calcium silicate crystals. The properties of each molded boards were determined according to the method of JIS A 9510 with the results shown below in Table 4.

TABLE 4

| Specimen No. | 1 | 2 | 3 |
|---|---|---|---|
| In molded product (%) | | | |
| Xonotlite secondary particles | 90 | 69.7 | 49.7 |
| Rutile | 0 | 20 | 40 |
| Pulp (NBKP) | 8 | 8 | 8 |
| Glass fibers | 2 | 2 | 2 |
| Moldability | Good | Good | Good |
| Properties of molded product | | | |
| Thickness (mm) | 40 | 40 | 40 |
| Number of laminated sheets (number) | 90 | 90 | 90 |
| Density (g/cm$^3$) | 0.403 | 0.404 | 0.406 |
| Bending strength (g/cm$^2$) | 65.2 | 49.3 | 42.8 |
| Thermal linear shrinkage percentage (%) | 1.20 | 1.19 | 1.22 |
| Thermal conductivity (Kcal/m.h.°C.) | | | |
| 70° C. | 0.063 | 0.056 | 0.052 |
| 150° C. | 0.071 | 0.061 | 0.054 |
| 250° C. | 0.082 | 0.067 | 0.056 |
| 350° C. | 0.094 | 0.073 | 0.058 |

EXAMPLE 6

Slurties of xonotlite crystals were produced by repeating the same procedure as in Example 4 with the exception of not adding titanium oxide particles.

To portions of the slurties was added the specific inorganic substance in such an amount that the molded product contains 25% of inorganic substance, and the slurry was molded in the same manner as in Example 2, producing a 25 mm-thick molded board of calcium silicate crystals (The molded board consists of 64.7% of secondary particles of xonotlite crystals, 25% of inactive substance, 8% of pulp, 2% of glass fibers, 0.1% of cationic coagulant and 0.2% of anionic coagulant).

Table 5 shows the properties of the molded products obtained above.

TABLE 5

| Specimen No. | 4 | 5 | 6 | 7 |
|---|---|---|---|---|
| Inactive substance | | | | |
| Kind | Silicon carbide | Iron oxide (Hematite) | Ilmenite | Manganese oxide |
| Content in molded product (%) | 25 | 25 | 25 | 25 |
| Mean particle size (μm) | 3.5 | 0.8 | 5.4 | 4.0 |
| Properties of molded product | | | | |
| Bulk density (g/cm$^3$) | 0.410 | 0.408 | 0.400 | 0.408 |
| Bending strength (kg/cm$^2$) | 45.3 | 44.2 | 45.1 | 46.7 |
| Thermal conductivity (Kcal/m.h.°C.) | | | | |
| Average temperature (°C.) | | | | |
| 70 | 0.056 | 0.056 | 0.057 | 0.055 |
| 150 | 0.059 | 0.059 | 0.059 | 0.058 |
| 250 | 0.064 | 0.064 | 0.065 | 0.064 |
| 350 | 0.071 | 0.072 | 0.075 | 0.071 |

| Specimen No. | 8 | 9 | 10 |
|---|---|---|---|
| Inactive substance | | | |
| Kind | Silicon nitride | Cerium oxide | Titanium oxide (Rutile) |
| Content in molded product (%) | 25 | 25 | 25 |
| Mean particle size (μm) | 5.0 | 1.8 | 1.2 |
| Properties of molded product | | | |
| Bulk density (g/cm$^3$) | 0.411 | 0.405 | 0.409 |
| Bending strength (kg/cm$^2$) | 44.1 | 45.0 | 44.3 |
| Thermal conductivity (Kcal/m.h.°C.) | | | |
| Average temperature (°C.) | | | |
| 70 | 0.056 | 0.057 | 0.055 |
| 150 | 0.059 | 0.059 | 0.058 |
| 250 | 0.064 | 0.065 | 0.063 |
| 350 | 0.071 | 0.075 | 0.070 |

EXAMPLES 7 TO 11

To 90 parts (solids) of the aqueous slurry of secondary particles of xonotlite crystals obtained in Example 1 were added a predetermined amount of a fibrous material selected from glass fibers, pulp and ceramic fibers and a predetermined amount (solids) of an emulsion of acrylic resin. Water was added to adjust the slurry to a concentration of 2.0%. To the slurry were added 0.2 part of a cationic macromolecular coagulant and 0.1 part of an anionic macromolecular coagulant, and the resulting mixture was adjusted with water to a concentration of 1.0%.

The thus obtained slurry was formed into thin sheets (weighing 180 g/m$^2$) with use of a tapping test machine. The sheets were superposed over one another, and simultaneously press-molded and dried with a hot press at 120° to 150° C., giving a 12 mm-thick molded board of calcium silicate according to the present invention.

Table 6 shows the amount of the components, suitability for forming into thin sheets, number of laminated thin sheets and properties of the molded board.

TABLE 6

| | Example | | | | |
|---|---|---|---|---|---|
| | 7 | 8 | 9 | 10 | 11 |
| Amount of components (part by weight) | | | | | |
| Xonotlite secondary particles | 86.7 | 83.7 | 80.7 | 87.7 | 89.7 |
| Pulp | 8 | 8 | 8 | — | — |
| Glass fiber | 2 | 2 | 2 | 2 | 4 |
| Ceramic fiber | — | — | — | 4 | — |
| Acrylic resin | 3 | 6 | 9 | 6 | 6 |
| Cationic coagulant | 0.2 | 0.2 | 0.2 | 0.2 | 0.2 |
| Anionic coagulant | 0.1 | 0.1 | 0.1 | 0.1 | 0.1 |
| Suitability for forming into sheets | A | A | A | B | B |
| Properties of molded product | | | | | |
| Thickness (mm) | 12 | 12 | 12 | 12 | 12 |
| Number of laminated sheets (number) | 40 | 40 | 40 | 40 | 40 |
| Density (g/cm$^3$) | 0.60 | 0.61 | 0.61 | 0.60 | 0.59 |
| Bending strength (kg/cm$^2$) | 175 | 210 | 225 | 190 | 180 |
| Thermal linear shrinkage percentage (%) | 1.1 | 1.2 | 1.4 | 1.0 | 1.1 |
| Incombustibility | A | A | B | A | A |
| Workability | A | A | A | A | A |
| Water resistance | A | A | A | A | A |
| Resistance to freezing and thawing | A | A | A | A | A |
| Nail-retaining ability | A | A | A | A | A |
| Screw-retaining ability | A | A | A | A | A |

The following is a notation of components used in Table 6.

Ceramic fiber: "S-Fiber" (trade name), product of Shin-Nittetsu Kagaku K. K.

Acrylic resin: "Boncoat SFC-300" (trade name), product of Dainippon Ink And Chemicals Inc.

Cationic coagulant: "Sunfloc C-009P" (trade name), product of Sanyo Kasei Kogyo Co., Ltd.

Anionic coagulant: "Sunfloc AH-210P" (trade name), product of Sanyo Kasei Kogyo Co., Ltd.

Properties of the molded products in the list were determined by the following methods.

1) Density, bending strength and thermal linear shrinkage percentage.

These properties were determined according to JIS A 9510. The thermal linear shrinkage percentages are those obtained by heating for 3 hours at 1000° C.

2) Incombustibility

This property was determined according to Notice No. 1828 of Ministry of Construction, Japan, and the result was evaluated according to the following criteria.

A: Acceptable as incombustible

B: Acceptable as almost incombustible

C: Rejected for not being incombustible

3) Workability

The molded products were nailed, sawed, planed, carved or modeled (grooved) and otherwise tested. The workability was evaluated according to the following criteria as compared with the results obtained by testing wood for workability.

A: Good
B: Fair
C: Poor

4) Water resistance

The water resistance was evaluated according to the following criteria in terms of the bending strength and dimensional stability determined after immersion in water for 24 hours (20° C.).

A: Good
B: Fair
C: Poor

5) Resistance to freezing and thawing

This property was determined according to JIS A 5108 (10 cycles), and the result was evaluated according to the following criteria.

A: Good
B: Fair
C: Poor

6) Suitability for forming into sheets

The property was evaluated according to the following criteria in terms of the filtering property and the strength of the thin sheets.

A: The filtering property and the strength of the sheet were satisfactory and thin sheets were smoothly formed.

B: A Slight difficulty was encountered in filtration, and the formation of thin sheets took a considerable time.

C: Thin sheets failed to be formed due to the poor strength.

7) Nail-retaining ability

According to JIS Z 2121.

A: Good
B: Fair
C: Poor

8) Screw-retaining ability

A: Good
B: Fair
C: Poor

EXAMPLE 12

The molded board of the present invention was produced in the same manner as in Example 8 with the exception of using a carboxy-modified styrene-butadiene copolymer (trade name "Nipol LX-430", product of Nippon Zeon Co., Ltd.) in place of acrylic resin. Properties of the molded board are shown below.

TABLE 7

|  | Example 12 |
|---|---|
| Density (g/cm$^3$) | 0.60 |
| Bending strength (kg/cm$^2$) | 220 |
| Thermal linear shrinkage percentage (%) | 1.2 |
| Incombustibility | A |
| Workability | A |
| Water resistance | A |
| Resistance to freezing and thawing | A |

TABLE 7-continued

|  | Example 12 |
|---|---|
| Nail-retaining ability | A |
| Screw-retaining ability | A |

EXAMPLE 13

The molded board of the invention was produced in the same manner as in Example 7 except that a latex of chloroprene polymer (trade name "Neoplene 115", product of Showa Neoplene Co., Ltd.), and an emulsion of styrene-acrylate copolymer (trade name "OLX-2153", product of Showa Highpolymer Co., Ltd.) were used in amounts of 3 parts and 1.5 parts, calculated as solids, respectively in place of acrylic resin and that the laminate consisted of 37 thin sheets. Shown below are properties of the obtained board.

TABLE 8

|  | Example 13 |
|---|---|
| Density (g/cm$^3$) | 0.60 |
| Bending strength (kg/cm$^2$) | 198 |
| Thermal linear shrinkage percentage (%) | 1.2 |
| Incombustibility | A |
| Workability | A |
| Water resistance | A |
| Resistance to freezing and thawing | A |
| Nail-retaining ability | A |
| Screw-retaining ability | A |

EXAMPLES 14 TO 17

To the aqueous slurry of secondary particles of xonotlite crystals obtained in Example 1 were added glass fibers, pulp, specific resins and then an anionic coagulant. The mixture was adjusted with water to a concentration of 1.0%.

The thus obtained slurry was formed into thin sheets (weighing 180 g/m$^2$) with use of a Fourdrinier-type forming device. The sheets were superposed over one another, and press-molded and dried at the same time with a hot press at 120° to 170° C., giving a 12 mm-thick board of calcium silicate according to the invention. Table 9 below shows the results.

TABLE 9

|  | Example | | | |
|---|---|---|---|---|
|  | 14 | 15 | 16 | 17 |
| Amount of components (part by weight) | | | | |
| Xonotlite secondary particles | 83.8 | 76.8 | 73.8 | 76.8 |
| Pulp | 8 | 8 | 8 | 8 |
| Glass fiber | 2 | 2 | 2 | 2 |
| Phenolic resin 1) | 6.0 | 13.0 | 16.0 | |
| Ethylene-vinyl acetate copolymer 2) | | | | 13.0 |
| Anionic coagulant 3) | 0.2 | 0.2 | 0.2 | 0.2 |
| Suitability for forming into sheets | A | A | A | A |
| Properties of molded product | | | | |
| Thickness (mm) | 12 | 12 | 12 | 12 |
| Number of laminated sheets (number) | 40 | 40 | 40 | 40 |
| Density (g/cm$^3$) | 0.60 | 0.61 | 0.59 | 0.60 |
| Bending strength (kg/cm$^2$) | 148 | 230 | 242 | 228 |

TABLE 9-continued

|  | Example | | | |
| --- | --- | --- | --- | --- |
|  | 14 | 15 | 16 | 17 |
| Thermal linear shrinkage percentage (%) | 1.0 | 1.4 | 1.5 | 1.8 |
| Incombustibility | A | A | A | B |
| Workability | A | A | A | A |
| Water resistance | A | A | A | A |
| Resistance to freezing and thawing | A | A | A | A |
| Nail-retaining ability | A | A | A | A |
| Screw-retaining ability | A | A | A | A |

Note:
1) Phenolic resin: "Shownol CKE2370" (trade name), product of Showa Highpolymer Co., Ltd.
2) Ethylene-vinyl acetate copolymer: "Polyzol AD-5" (trade name), product of Showa Highpolymer Co., Ltd.
3) Anionic coagulant: "Sunfloc AH-400P" (trade name), product of Sanyo Kasei Kogyo Co., Ltd.

EXAMPLES 18 TO 24

Specific fibers and a styrene-acrylate copolymer were added to the aqueous slurry of secondary particles of xonotlite crystals obtained in Example 1, followed by addition of specific coagulants. The mixture was adjusted with water to a concentration of 1.0%.

The thus obtained slurry was made into thin sheets (weighing 180 g/m$^2$) using a Fourdrinier-type forming device. The sheets were superposed over one another and simultaneously press-molded and dried with a hot press at 160° to 170° C., giving a 12 mm-thick board of calcium silicate according to the invention. Table 10 below shows the results.

TABLE 10

|  | Example | | |
| --- | --- | --- | --- |
|  | 18 | 19 | 20 |
| Amount of components (part by weight) | | | |
| Xonotlite secondary particles | 86.7 | 86.7 | 90.7 |
| Pulp | 5 | 5 | 0 |
| Glass fiber | 5 | 5 | 5 |
| Carbon fiber 1) | — | — | 1 |
| Aramid fiber 2) | — | — | — |
| Styrene acrylate copolymer 3) | 3 | 3 | 3 |
| Cationic coagulant 4) | 0.2 | — | — |
| Anionic coagulant 5) | 0.1 | 0.3 | 0.3 |
| Nonionic coagulant 6) | — | — | — |
| Suitability for forming into sheets | A | A | A |
| Properties of molded product | | | |
| Thickness (mm) | 12 | 12 | 12 |
| Number of laminated sheets (number) | 27 | 27 | 27 |
| Density (g/cm$^3$) | 0.39 | 0.39 | 0.40 |
| Bending strength (kg/cm$^2$) | 100 | 95 | 110 |
| Thermal linear shrinkage percentage (%) | 1.1 | 1.1 | 1.0 |
| Incombustibility | A | A | A |
| Workability | A | A | A |
| Water resistance | A | A | A |
| Resistance to freezing and thawing | A | A | A |
| Nail-retaining ability | A | A | A |
| Screw-retaining ability | A | A | A |

TABLE 10-continued

|  | Example | | | |
| --- | --- | --- | --- | --- |
|  | 21 | 22 | 23 | 24 |
| Amount of components (part by weight) | | | | |
| Xonotlite secondary particles | 90.7 | 87.7 | 87.7 | 87.7 |
| Pulp | — | — | — | — |
| Glass fiber | 5 | 5 | 5 | 5 |
| Carbon fiber | — | — | — | — |
| Aramid resin | 1 | — | — | — |
| Styrene acrylate copolymer | 3 | 6 | 6 | 6 |
| Cationic coagulant | — | — | — | — |
| Anionic coagulant | 0.3 | 0.3 | — | — |
| Nonionic coagulant | — | — | 0.3 | 0.3 |
| Suitability for forming into sheets | A | A | A | A |
| Properties of molded product | | | | |
| Thickness (mm) | 12 | 12 | 12 | 12 |
| Number of laminated sheets (number) | 27 | 27 | 27 | 21 |
| Density (g/cm$^3$) | 0.40 | 0.40 | 0.40 | 0.30 |
| Bending strength (kg/cm$^2$) | 113 | 105 | 103 | 56 |
| Thermal linear shrinkage percentage (%) | 1.1 | 1.2 | 1.2 | 1.6 |
| Incombustibility | A | A | A | A |
| Workability | A | A | A | A |
| Water resistance | A | A | A | A |
| Resistance to freezing and thawing | A | A | A | A |
| Nail-retaining ability | A | A | A | A |
| Screw-retaining ability | A | A | A | A |

Note:
1) Carbon fiber: "Kureka chop C-110T" (trade name), product of Kureha Chemical Industry Co., Ltd.
2) Aramid fiber: "Technora T-320" (trade name), product of Teijin Limited
3) Styrene acrylate: "OLX 2153" (trade name), product of Showa Highpolymer Co., Ltd.
4) Cationic coagulant: "Sunfloc C-009P" (trade name), product of Sanyo Kasei Kogyo Co., Ltd.
5) Anionic coagulant: "Sunfloc AH-210P" (trade name), product of Sanyo Kasei Kogyo Co., Ltd.
6) Nonionic coagulant: "Sunfloc N-505P" (trade name), product of Sanyo Kasei Kogyo Co., Ltd.

EXAMPLE 25

Thin sheets were produced in the same manner as in Example 14. The thin sheets were superposed over one another, and simultaneously press-molded and dried with a hot press at 160° to 170° C., giving a 40 mm-thick board of calcium silicate (135 thin sheets laminated) according to the invention. Table 11 below shows the results.

TABLE 11

|  | Example 25 |
| --- | --- |
| Density (g/cm$^3$) | 0.60 |
| Bending strength (kg/cm$^2$) | 150 |
| Thermal linear shrinkage percentage (%) | 1.1 |
| Incombustibility | A |
| Workability | A |
| Water resistance | A |
| Resistance to freezing and thawing | A |
| Nail-retaining ability | A |
| Screw-retaining ability | A |

To check the homogeneity of density, the obtained molded product was divided into 5 pieces in the direction of thickness. Then the density of each piece was determined. The top and bottom pieces had a density of 0.592 g/cm$^3$, and the other 3 pieces had a density of from 0.611 to 0.612 g/cm$^3$.

We claim:

1. A board comprising calcium silicate crystals, composed of a plurality of laminated thin sheets, each of the thin sheets having a thickness of 2 mm or less, and each consisting of secondary particles of calcium silicate crystals, a fibrous material and a coagulant adsorbed on the surface of the secondary particles, said secondary particles of calcium silicate being interconnected with one another, within each of said thin sheets and between adjacent thin sheets thereby firmly uniting said thin sheets to each other into said board as an integral body.

2. A board as claimed in claim 1 wherein said calcium silicate crystals are at least one selected from the group consisting of tobermorite crystals, xonotlite crystals and wollastonite crystals.

3. A board as claimed in claim 1 wherein said coagulant is a polymer.

4. A board as claimed in claim 3 wherein said polymeric coagulant is at least one coagulant selected from the group consisting of a cationic coagulant, an anionic coagulant and a nonionic coagulant.

5. A board as claimed in claim 1 wherein the content of the fibrous material is 2 to 30% by weight based on total weight of board.

6. A board as claimed in claim 5 wherein the content of fibrous material is 2 to 20% by weight based on total weight of board.

7. A board as claimed in claim 5 wherein the content of fibrous material is 5 to 15% by weight based on total weight of board.

8. A board comprising calcium silicate crystals, composed of a plurality of laminated thin sheets, each of the thin sheets having a thickness of 2 mm or less, and each thin sheet consisting of secondary particles of calcium silicate crystals, a fibrous material, a coagulant adsorbed on the surface of the secondary particles, and wherein at least one of said thin sheets additionally contains at least one inert inorganic substance selected from the group consisting of a carbonaceous substance, a carbide, a nitride, a silicide and a metallic oxide., said secondary particles of calcium silicate being interconnected with one another, within each of said thin sheets and between adjacent thin sheets thereby firmly uniting said thin sheets to each other into said board as an integral body.

9. A board as claimed in claim 8 which contains 2 to 70% by weight of said substance based on total weight of board.

10. A board as claimed in claim 8 wherein said carbonaceous substance is at least one substance selected from the group consisting of active carbon, charcoal, coal, carbon black and graphite; the carbide is at least one carbide selected from the group consisting of silicon carbide, boron carbide and titanium carbide; the nitride is at least one nitride selected from the group consisting of silicon nitride, boron nitride and titanium nitride; the silicide is calcium silicide; and the metallic oxide is at least one metallic oxide selected from the group consisting of iron oxides, titanium oxides, tin oxides, manganese oxides, zirconium oxides, ilmenite, zircon, chromite, cerium oxides, lanthanum oxides, yttrium oxides and neodymium oxides.

* * * * *